Sept. 1, 1964  McKINLEY S. CARLSON  3,147,389
MEANS FOR BALANCING LOSSES IN ENCLOSURES OF ISOLATED PHASE BUS
Filed March 13, 1961  2 Sheets-Sheet 1

INVENTOR.
McKINLEY S. CARLSON
BY
OSTROLENK, FABER, GERB & SOFFEN
ATTORNEYS

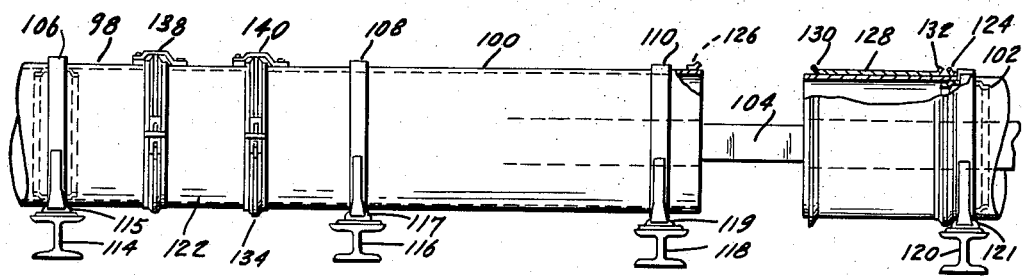
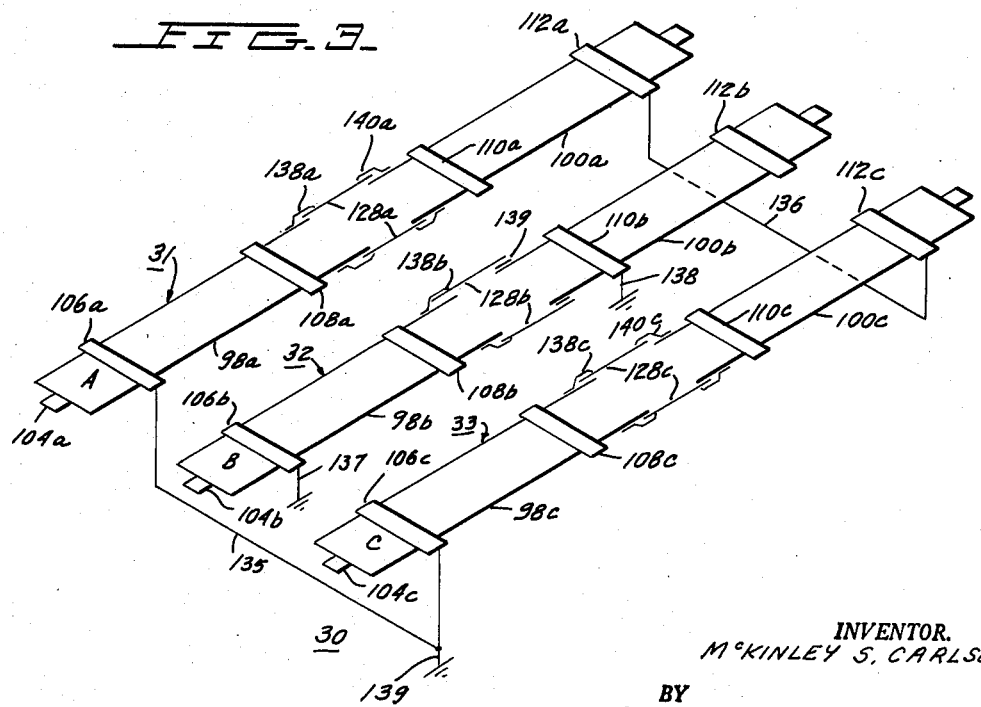

United States Patent Office 3,147,389
Patented Sept. 1, 1964

3,147,389
MEANS FOR BALANCING LOSSES IN ENCLO-
SURES OF ISOLATED PHASE BUS
McKinley S. Carlson, Haverford, Pa., assignor to I-T-E
Circuit Breaker Company, Philadelphia, Pa., a corpo-
ration of Pennsylvania
Filed Mar. 13, 1961, Ser. No. 95,389
9 Claims. (Cl. 307—147)

My invention relates to isolated phase bus, and more particularly to isolated phase bus used in multiphase systems having novel means to reduce losses in the bus enclosures.

Isolated phase bus presently in use is designed to transmit electricity having extremely high voltage and current magnitudes. The enclosures for the bus conductors being formed of a highly conductive metal such as aluminum have current-carrying capacities which are equal to or which are greater than the current-carrying capacity of the bus conductors which they enclose. Due to the alternating current wave form exhibited by the current carried by the bus conductor, the bus conductors of each phase produce time-varying magnetic fields. The magnetic field lines which cut the metallic enclosure induce eddy currents to be set up in the enclosures of each phase.

Since the metallic conductor has a certain resistivity, the eddy currents present in the enclosure generate an amount of heat which is proportional to $I^2R$ where I is equal to the magnitude of the eddy currents induced in the enclosure, and R is equal to the resistance of the metallic enclosure. The bus conductor housed in each metallic enclosure also exhibits an amount of heating which is proportional to $I_1^2R_1$ where $I_1$ is equal to the current passing through the bus conductor, and $R_1$ is equal to the resistance of the bus conductor. Since the current $I_1$ passing through the bus conductor is of an extremely high magnitude, the amount of heat generated by the $I_1^2R_1$ losses is extremely large, even though the resistivity of the bus conductor is relatively small. These heating losses impair the efficiency of the power transmission system, thereby creating the need for means which are designed as part of the bus structure to minimize such losses.

One method of cooling the bus conductors consists of dividing the conductive bus enclosure into a plurality of enclosure segments, and placing an insulating material between the ends of adjacent segments. This results in a limiting action upon the eddy currents generated in each enclosure segment by confining the eddy currents to their respective enclosure segments. This is analogous to transformer core design wherein the core is made up of a plurality of insulated laminations, the insulation between each lamination serving to confine the eddy currents of each lamination to its respective lamination. This design reduces the $I^2R$ heating losses generated in the bus enclosures such that the heat generated by the bus enclosures is substantially less than the heat generated by the bus conductor housed within the enclosure. The bus enclosure acts as a heat sink by adsorbing the heat generated by the bus conductor housed in the bus enclosure and subsequently radiating the heat absorbed to the surrounding atmosphere.

Another method employed to reduce heat generated by the bus conductors consists of forcing a coolant under pressure through the metallic enclosure. The coolant absorbs the heat generated by the bus conductor, thereby substantially reducing its operating temperature. The coolant is then passed through a heat exchanger and recirculated through the metallic housing. The first method has the disadvantage of requiring a large number of metallic enclosure segments and insulating means between adjacent segments, thus requiring a large amount of time and labor in construction of the enclosures and in setting up the bus run. The second method has the disadvantage of requiring a coolant system which increases the complexity of the bus run, and which requires regular maintenance over and above that required by the bus run.

Another disadvantage which is present in both the first and second methods set forth above is the structural strength required in the bus run supports. During the occurrence of a fault current condition in the bus run the bus conductors carry fault currents of extremely high magnitude. These fault currents generate large electromagnetic forces which interact with each other to urge the conductors of each phase towards one another or away from one another, depending upon the direction of the currents flowing in each phase at the instant that the fault current condition occurs. The enclosures of each bus conductor must, therefore, be supported by structures having sufficient strength to prevent any sidewise movement of the metallic bus enclosures.

The design of my isolated phase bus system permits the use of supporting structure having substantially less weight and strength than supporting structure utilized in the prior art, since the electromagnetic forces generated by the currents carried by the bus conductors is substantially eliminated in the region outside of the metallic bus enclosures.

My invention consists of a three-phase isolated phase bus system. The bus conductors of each phase are surrounded by metallic enclosures. Each metallic enclosure consists of a plurality of enclosure segments, the length of which are limited only by the inherent support strength of each segment. Each segment of one phase is electrically connected to the adjacent enclosure segment, thereby forming a continuous conductive path throughout the length of the enclosure. The enclosures of each phase are arranged so that all three conductors lie in one horizontal plane. One end of the bus enclosures lying on opposite sides of the center enclosure may be electrically grounded. The other ends of the outside enclosures are electrically connected to one another. The segments of the metallic enclosure surrounding the central bus conductor of the center phase are electrically insulated from one another and from the metallic enclosures of the two outside phases. Although the electrical connections between the outside phases permit a shielding current to flow, thereby raising the losses and temperatures of the outside phases, the outside phases have a substantially greater region in which to radiate heat than does the central phase which cannot radiate heat in the horizontal direction due to the presence of the outside phases. The overall cooling of the three phases, however, is sufficient to prevent any impairment of the efficiency of the system. Since the outside phases are electrically connected, they carry a shielding current which is approximately equal in magnitude to the currents of the bus conductors housed therein, and which are opposite in direction to the current carried by the associated bus conductors. This results in a magnetic field pattern which is substantially zero outside the region of the bus enclosures of the outside phases. Thus, although the conductor of the center phase may generate a magnetic flux pattern which exists beyond the region of the metallic enclosure of the central phase, there is no other magnetic field with which the magnetic field of the central bus conductor may interact. This means that no forces will be exerted between or among the conductors during a fault current condition, enabling the use of structural supports for the three-phase bus run having substantially less strength than bus run supports of the prior art. In addition, the absence of electromagnetic fields surrounding the metallic enclosures of the outside phases prevents eddy currents from ebing induced in the bus run support structure, thereby preventing the occurrence of $I^2R$ heating losses in the supporting structure.

It is, therefore, one object of my invention to provide a novel arrangement to equalize the heating losses of each phase in an isolated phase bus structure.

Another object of my invention is to provide multiphase isolated phase bus structure having novel means connected to only some of said phases for preventing the interaction of electromagnetic forces between phases.

Another object of my invention is to provide a multiphase isolated phase bus structure having novel means connected to less than all of said phases to prevent the occurrence of large heating losses in the supporting structure.

Still another object of my invention is to provide an isolated phase bus structure which is so arranged as to permit the use of relatively light-weight supporting structure.

Another object of my invention is to provide a three-phase isolated phase bus structure in which the outer phases are electrically connected to one another whereas the central phase is electrically insulated therefrom in order to equalize the heating losses and the interaction of electomagnetic forces occurring in the bus structure.

These and other objects of my invention will become apparent from the following description when taken in connection with the dawings, in which:

FIGURE 3 is a schematic view of my novel three-phase isolated phase system.

FIGURE 4 is a side plan view of bus structure utilized in the system of FIGURE 3.

Figure 1:
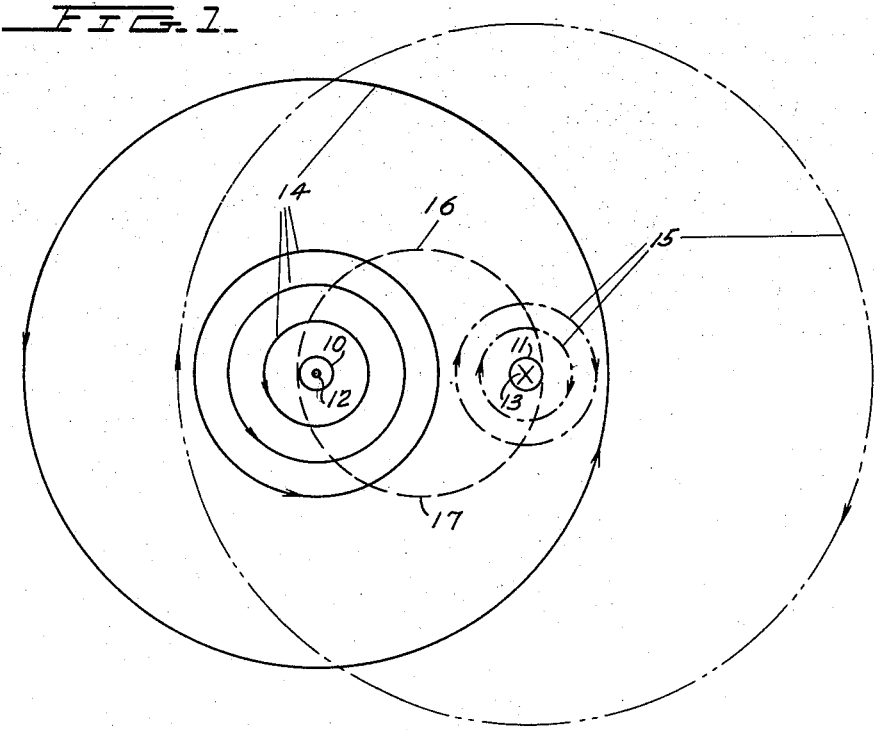
FIGURE 1 shows the magnetic field generated by two current-carrying conductors.

Referring now to the drawings, FIGURE 1 shows two current-carrying conductors 10 and 11. The current in conductor 10 is flowing in a direction which is out of the plane of the figure, as shown by dot 12, while the current in conductor 11 is flowing inward towards the plane of FIGURE 1, as shown by the cross 13. The current flowing in conductor 10 generates a magnetic field represented by circular loops 14. The direction of the magnetic field around conductor 10, according to the "right hand rule," is counterclockwise about conductor 10. The magnetic field generated by the current in conductor 11 is represented by closed loops 15. The direction of the magnetic flux lines 15 are counterclockwise about conductor 11, since the current flowing through conductor 11 is opposite in direction to that flowing through conductor 10.

The portions of flux lines 14 and 15 lying in the region 16 between conductors 10 and 11 have the same direction and, therefore, add together to form a resultant magnetic field which is the sum of the field strengths due to the currents flowing through conductors 10 and 11.

The flux lines 14 and 15 which are beyond the region 16 between conductors 10 and 11 are opposite in direction and tend to cancel one another out. It can, therefore, be seen from this pictorial representation that the resultant magnetic flux pattern in the region bounded by line 16 is equal to twice the magnetic field strength of the field generated by one current-carrying conductor (assuming that the currents in each conductor are equal), while the magnetic field strength outside the region bounded by phantom line 16 is substantially zero.

Figure 2A:
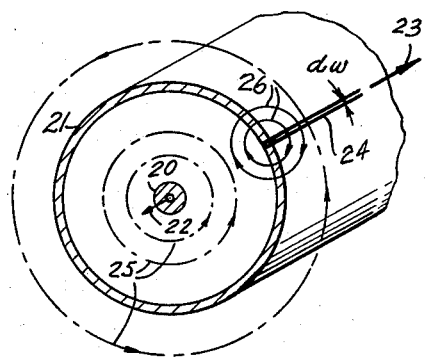
FIGURES 2a and 2b show the magnetic fields generated by a central conductor and a surrounding metallic enclosure.

FIGURE 2a shows a current-carrying conductor 20, surrounded by a current-carrying enclosure 21. The current flowing through conductor 20 is in the direction shown by arrow 22, whereas the current flowing in metallic enclosure 21 is flowing in the direction shown by arrow 23.

Figure 2B:
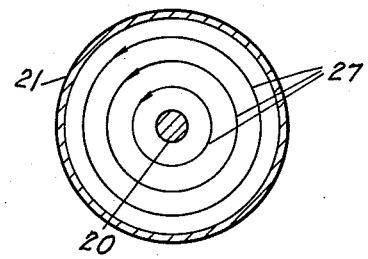

Metallic enclosure 21 may be considered as being composed of a plurality of straight conductors 24 each having a width $dw$. The current flowing through conductor 20 sets up a magnetic field represented by loops 25, each having a magnetic direction which is counterclockwise with respect to conductor 20. Each of the conductors 24 which combine to form metallic enclosure 21 set up a magnetic field pattern represented by loops 26 having a magnetic direction which is clockwise about conductor 24. The magnetic flux lines 25 and the portions of magnetic flux lines 26 which are contained within the region bounded by metallic enclosure 21 add together to form a resultant field which is the sum of the magnetic fields generated by the current in conductor 20 and the currents in each differential conductor 24 which make up metallic enclosure 21. The magnetic flux lines 25 and the portions of flux lines 26 which are outside the region bounded by metallic conductor 21 have opposing magnetic directions and tend to cancel, thereby creating a resultant magnetic field in the region outside of metallic enclosure 21 which is substantially zero. The resultant magnetic field is shown in FIGURE 2b where flux lines 27 are equal to the sum of flux lines 25 and 26 shown in FIGURE 2a. It can, therefore, be seen that if a sheath current is permitted to flow in the metallic conductor 21 of an isolated phase bus system, the magnetic field outside of the enclosure is substantially zero.

Referring now to FIGURES 3 and 4, a three-phase isolated phase bus system 30 is comprised of phases 31, 32 and 33 which are in horizontal alignment. The physical structure of each phase may be constructed as shown in FIGURE 4 which is similar to the bus structure taught in U.S. application No. 844,455, filed October 5, 1959, now Patent 3,046,422, by Roy H. Albright, entitled "Coaxial Metal Enclosed Isolated Phase Bus" and assigned to the same assignee as the instant invention. The bus structure of the aforementioned application lends no novelty to the instant invention, and is cited only as one exemplary structure.

FIGURE 4 shows typical enclosure sections 98, 100 and 102 of one phase which enclosures surround a central conductor 104 by means of insulators (not shown) which extend from the internal surfaces of the enclosures to the bus conductor 104 in order to position bus 104 along the longitudinal axis of enclosures 98, 100 and 102. The enclosures are provided with support rings 106, 108, 110 and 112 which are secured to the enclosures and are provided with mounting feet in any desired manner for mounting to transverse structural supports such as I-beams 114, 116, 118 and 120. The enclosures are insulated from the I-beams by insulating pads 115, 117, 119 and 121 which are positioned between I-beams 114, 116, 118 and 120 respectively and their respective rings.

In order to permit physical inspection and replacement of the central conductor and insulator supports therefor, slidable covers such as slidable covers 122 and 128 are provided between bus enclosures where slidable cover 122 extends between enclosures 98 and 100, while cover 128 which extends between enclosures 100 and 102 is moved back to expose the bus. The slidable covers have a diameter which is greater than the diameter of the bus enclosures so that it may be telescoped into one of the adjacent covers when it is opened.

For carrying these enclosure covers, the left-hand end of the bus enclosures such as enclosures 100 and 102 is provided with a movable flange 124. The right-hand end of each bus enclosure 98 and 100 is also provided with a flange 126 which is welded directly to the enclosure. The cover, such as right-hand cover 128 which has been opened to its right-hand position, is provided with similar flanges 130 and 132 which cooperate with flanges 126 and 124 respectively of the enclosures 100 and 102.

Locking rings such as the locking ring 134 are placed over abutting flanges and are then locked into place, drawing the flanges into engagement. An annular gasket (not shown) is mounted in such a manner as to be sandwiched between the adjacent flanges to assure an airtight joint.

In order to assure electrical continuity through the enclosures 98, 100, 102, conductor straps such as straps 138 and 140 for cover 122 are provided.

The outer phases 31 and 33 (see FIGURE 3) are similar in design to the bus structure shown in FIGURE 4 wherein like elements carry like numerals. Conductive means 135 electrically connects support ring 106a to 106c, and subsequently connects these rings to ground potential at 139. Conductive means 136 electrically connects support ring 112a to support ring 112c. This arrangement, coupled with the arrangement of grounding straps 138a, 140a, 138c and 140c, forms a closed conductive path which extends from conductive means 135, ring 106a, enclosure 98a, grounding straps 138a, cover 128a, grounding straps 140a, enclosure 100a, ring 112a, conductive means 136, ring 112c, enclosure 100c, grounding straps 140c, cover 128c, grounding straps 138c, enclosure 98c, and ring 106c to conductive means 135.

This closed current loop permits a sheath current to flow through the enclosures 98a–100a and 98c–100c of phases 31 and 33 respectively. This sheath current is induced by the magnetic field which is generated by the bus current flowing through bus conductors 104a and 104c.

The center phase 32, however, is arranged in such a manner as to prevent any continuous current flow between adjacent enclosures 98b and 100b. This is done by placing insulating means 139 between cover 128b and enclosure 100b, thereby cutting off any current path between cover 128b and enclosure 100b. Enclosures 98b and 100b are also grounded by grounding means 137 and 138 respectively. Grounding means 137 and 138 and insulating means 139 serve to limit the eddy currents as in enclosures 98b and 100b, in addition to preventing continuous current flow along the enclosures of central phase 32.

The currents which are induced in the enclosures of the outer phases 31 and 33 by their associated central bus conductors 104a and 104c flow in a direction which is opposite to the direction of current flow in bus conductors 104a and 104c. The current flowing through bus enclosures 98a, 100a, 98c and 100c are substantially equal in magnitude to the currents flowing through bus conductors 104a and 104c respectively, thereby producing a result similar to that obtained in the description of FIGURES 2a and 2b, namely, that the magnetic flux patterns outside of the regions bounded by enclosures 98a–100a and 98c–100c is substantially zero.

Since no sheath current flows in the enclosures 98b and 100b of phase 32, the magnetic field pattern generated by central bus conductor 104b will extend beyond the region bounded by the central bus enclosure 98b and 100b. However, no electromagnetic forces will be exerted between the phases, since there is no electromagnetic field with which the magnetic field generated by the central bus conductor 104b may interact. This is true during the presence of a fault current condition, as well as during normal operation enabling the bus supporting structures 114, 116, 118 and 120 (see FIGURE 4) to be substantially light in weight since the supporting structure need not be designed to withstand the enormous electromagnetic forces which are generated during fault current conditions. In addition, since phases 31 and 33 of the three-phase system 30 develop no magnetic field outside the region bounded by the bus enclosures of those phases, the bus structure is not exposed to any heating losses during either normal or fault current operation due to the magnetic fields generated by the bus conductors of system 30.

Although the sheath currents which are permitted to flow in the bus enclosures of outer phases 31 and 33 generate $I^2R$ heating losses which are greater than the heating losses developed in the enclosures of central phase 32, due to the eddy current flow, the outer phases 31 and 33 have a greater region in which to radiate the heat which is generated by the sheath current flow. The central phase 32, being positioned between the outer phases 31 and 33, has a smaller region in which to radiate the heat generated in the bus enclosures 98b and 100b, but the design of central phase 32 is such that the heat generated in the bus enclosures of the central phase is substantially less than heat generated in the outer phases so that all three phases are cooled at substantially the same rate. This assures perfect balance in the three phase system.

The bus enclosures utilized in my invention may also be arranged so that each enclosure is positioned at the vertex of an equilateral triangle. With this arrangement, it is immaterial as to which two of the three phases are connected in the manner of phases 31 and 33 shown in FIGURE 3. An arrangement of this nature permits the phase not carrying the sheath current (such as phase 32 of FIGURE 3) to have a larger region in which to radiate the heat which it generates due to the currents induced by the magnetic field.

It can be seen from the foregoing that I have provided a three-phase isolated phase bus system which operates at a high degree of efficiency without the need of a separate cooling system and in which no electromagnetic forces are exerted between or among the phases, thereby permitting the use of substantially light-weight supporting structure.

Although I have described perferred embodiments of my novel invention, many variations and modifications will now be obvious to those skilled in the art, and I prefer, therefore, to be limited not by the specific disclosure herein but only by the appended claims.

I claim:

1. A multiphase isolated phase bus structure each of said phases having a bus bar and metallic housing means for enclosing said bus bar and insulating means; said insulating means mounted for supporting said bus bars in spaced relationship from said housing means, first conductive means electrically connecting the first ends of the housing means of at least two of said phases and second conductive means electrically connecting the second ends of the housing means of said two phases to form a continuous closed current loop which includes the housings of said two phases to reduce the electromagnetic forces existing between the phases, insulating means mounted along the housing means of at least one of said remaining phases to prevent continuous current flow in said one remaining phase.

2. A multiphase isolated phase bus structure; each of said phases having a bus bar and metallic housing means for enclosing said bus bar and insulating means; said insulating means mounted for supporting said bus bars in spaced relationship from said housing means, first conductive means connecting the first ends of the housing means and second conductive means connecting the second ends of the two housing means of at least two of said phases to form a continuous closed current loop which includes the housings of said two phases to reduce the electromagnetic forces existing between the phases; said first and second conductive means including means for connecting said continuous current loop to ground potential.

3. A three phase isolated phase bus structure, each of said phases having a bus bar and metallic housing means for enclosing said bus bar and insulating means mounted for supporting said conductor in spaced relationship from said housing means, said phases being mounted to lie in a plane in a spaced parallel arrangement, first conductive means connecting the first ends of the housing means and second conductive means connecting the second ends of the two housing means of the two outer phases to form a continuous closed current loop which includes the housings of said two phases to reduce the magnitude of the magnetic fields outside of said housing means of said outer phases to prevent the occurrence of electromagnetic forces between all of said phases.

4. A three phase isolated phase bus structure, each of said phases having a bus bar and metallic housing means for enclosing said bus bar and insulating means mounted for supporting said conductor in spaced relationship from said housing means, said housing means of said phases being arranged in a plane in spaced parallel fashion, first conductive means connected to the first ends of the housing means and second conductive means connecting the second ends of the two housing means of two of said phases to form a continuous closed current loop which includes the housings of said two phases to prevent the occurrence of electromagnetic forces between phases during periods of current flow, the housing means of the central phase including insulating means to reduce eddy currents generated in the central phase housing means.

5. A three phase isolated phase bus structure, each of said phases having a bus bar and metallic housing means for enclosing said bus bar and insulating means mounted for supporting said conductor in spaced relationship from said housing means, said housing means of said phases being arranged to form an equilateral triangle, each of said housing means lying at one vertex of the equilateral triangle with the longitudinal axes of said housing means being parallel to each other; first conductive means connected to the first ends of the housing means and second conductive means connecting the second ends of the two housing means of two of said phases to form a continuous closed current loop which includes the housings of said two phases to prevent the occurrence of electromagnetic forces between phases during periods of current flow.

6. A three phase isolated phase bus structure, each of said phases having a bus bar and metallic housing means for enclosing said bus bar and insulating means, said insulating means being mounted to supoprt said bus bar in spaced relationship from said housing means, each of said housing means comprising a plurality of metallic housing sections aligned in tandem fashion, cover means positioned between adjacent housing sections to form a continuous housing, said phases being aligned in a plane in spaced parallel fashion, conductive straps connected between said cover means and said housing sections of the two outer phases to provide a continuous current path along the entire length of said two housing means, first conductive means connecting the first ends of the said two housing means and second conductive means connecting the second ends of the two housing means of the outer phases to form a closed current loop to prevent the occurrence of electromagnetic forces between the phases.

7. A three phase isolated phase bus structure, each of said phases having a bus bar and metallic housing means for enclosing said bus bar and insulating means, said insulating means being mounted to support said bus bar in spaced relationship from said housing means, each of said housing means comprising a plurality of conductive housing sections aligned in tandem fashion, cover means positioned between adjacent housing sections to form a continuous housing, said phases being aligned in a plane in spaced parallel fashion, conductive straps connected between said cover means and said housing sections of the two outer phases to provide a continuous current path along the entire length of said two housing means, first conductive means connecting the first ends of the two housing means and second conducting means connecting the second ends of the two housing means of the outer phases to form a closed current loop to prevent the occurrence of electromagnetic forces between the phases, the housing means of the central phase including second insulating means positioned between said housing sections and said cover means to isolate adjacent housing sections to reduce eddy current effects.

8. A three phase isolated phase bus structure, each of said phases having a bus bar and metallic housing means for enclosing said bus bar and insulating means, said insulating means being mounted to support said bus bar in spaced relationship from said housing means, each of said housing means comprising a plurality of conductive housing sections aligned in tandem fashion, cover means positioned between adjacent housing sections to form a continuous housing, said phases being aligned in a plane in spaced parallel fashion, conductive straps connected between said cover means and said housing sections of the two outer phases to provide a continuous current path along the entire length of said two housing means, first conductive means connecting the first ends of the housing means and second conductive means connecting the second ends of the two housing means of the two outer phases to form a closed current loop which includes the housings of said two phases to prevent the occurrence of electromagnetic forces between the phases, the housing means of the central phase including second insulating means positioned between said housing sections and said cover means to isolate adjacent housing sections of said central phase, support means positioned at spaced intervals of each phase for positioning and securing said phases, a third and fourth conductive means for connecting said first and second conductive means and said central phase housing sections respectively to ground potential.

9. A three phase isolated phase bus structure, each of said phases having a bus bar and metallic housing means for enclosing said bus bar and insulating means, said insulating means being mounted to support said bus bar in spaced relationship from said housing means, each of said housing means comprising a plurality of conductive housing sections aligned in tandem fashion, cover means positioned between adjacent housing sections to form a continuous housing, said phases being aligned in a plane in spaced parallel fashion, conductive straps connected between said cover means and said housing sections of the two outer phases to provide a continuous current path along said housing means, first conductive means connecting the first ends of the housing means and second conductive means connecting the second ends of the two housing means of the outer phases to form a closed current loop which includes the housings of said two phases to prevent the occurrence of electromagnetic forces between the phases, the housing means of the central phase including second insulating means positioned between said housing sections and said cover means to isolate adjacent housing sections, each of said housing sections having flanged ends, locking means surrounding the flanged edges of adjacet housing sections to draw said adjacent flanges into engagement, sealing means mounted between said adjacent flanges and said locking means to form an airtight joint.

References Cited in the file of this patent
UNITED STATES PATENTS

| | | |
|---|---|---|
| 2,293,310 | Rudd | Aug. 18, 1942 |
| 2,970,185 | Swerdlow et al. | Jan. 31, 1961 |
| 3,015,743 | Skeats | Jan. 2, 1962 |